(No Model.) 2 Sheets—Sheet 1.

T. W. MOORE.
Sulky.

No. 243,151 Patented June 21, 1881.

Witneses:
W. J. Morgan
S. H. Morgan

Tho W Moore
Inventor.
By A. P. Thayer
atty (No Model.) 2 Sheets—Sheet 2.

T. W. MOORE.
Sulky.

No. 243,151. Patented June 21, 1881.

Witnesses:
W. Morgan
S. H. Morgan

Thos. W. Moore
Inventor.
By A. P. Thayer
atty

UNITED STATES PATENT OFFICE.

THOMAS W. MOORE, OF PLAINFIELD, NEW JERSEY, ASSIGNOR TO FREDERICK M. MOORE, OF CAMDEN, NEBRASKA.

SULKY.

SPECIFICATION forming part of Letters Patent No. 243,151, dated June 21, 1881.

Application filed March 2, 1881. (No model.)

*To all whom it may concern:*

Be it known that I, THOS. W. MOORE, of Plainfield, Union county, New Jersey, have invented a new and useful Improvement in Sulkies, of which the following is a specification.

My invention consists of the combination, with wheels advanced along the sides of the horse and arranged on short independent axles, of a frame going wholly around the horse, or around the breast and over the back, to stay the independent axles properly, and a seat supported over the back of the horse by supports rising up from the axles inside of the wheels, or both inside and outside. The object is to contrive a substantial but light construction having the wheels advanced along the sides of the horse as far as desirable for the best results of speed.

Figure 1:
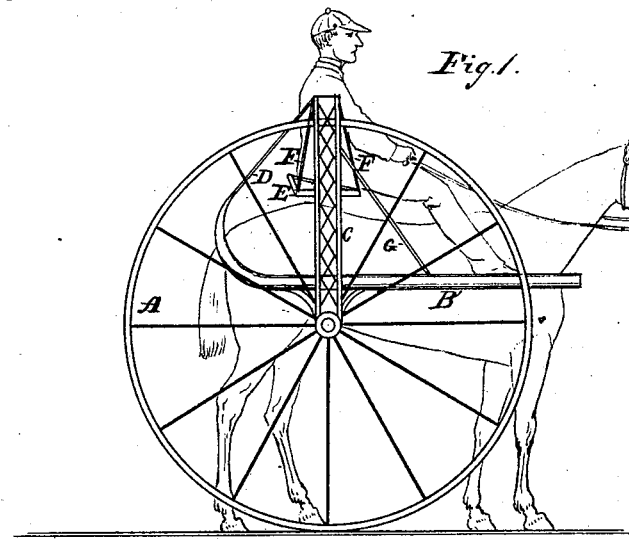
Figure 2:
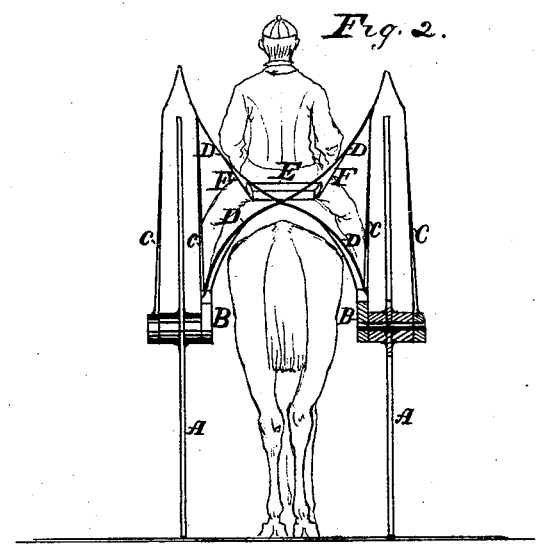
Figure 3:
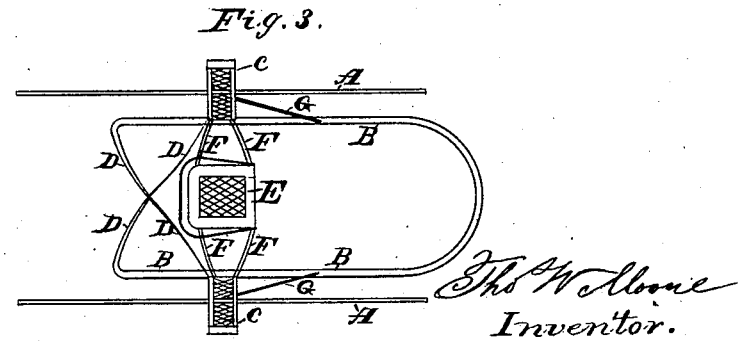
Figure 4:
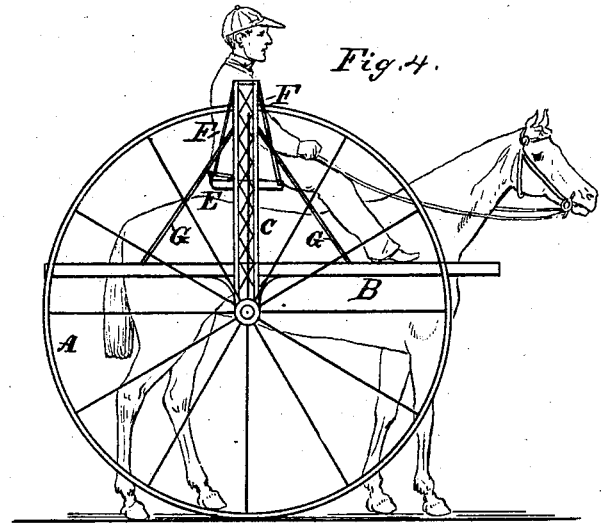
Figure 5:
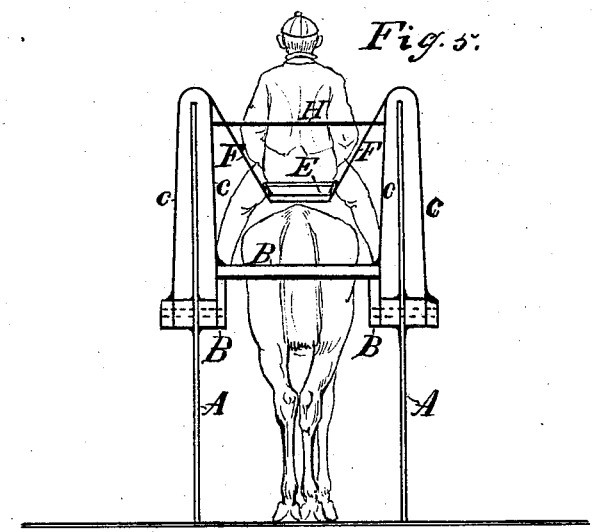

Figures 1 and 4 in the accompanying drawings are side elevations of my improved sulky. Figs. 2 and 5 are rear elevations, and Figs. 3 and 6 are plan or top views.

Figure 6:
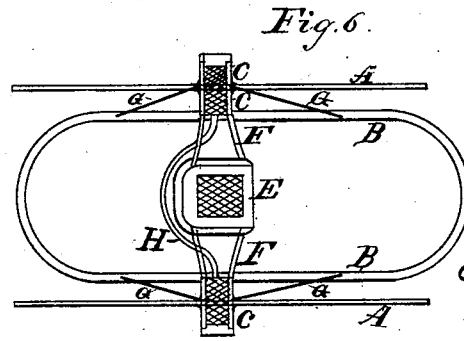

A represents the wheels, which are mounted on short axles that are suitably attached to the frame B, for being located at the sides of the horse when harnessed to the sulky; and to compensate for the lack of strength of the axles in consequence of being made separately, instead of together in one, the frame B is extended wholly around the breast and hind part of the horse, as in Figs. 4, 5, and 6, or around the breast and over the back, as in Figs. 1, 2, and 3, while the seat E is supported by uprights C, rising up from the axles or over them, to which said seat is connected by rods F or other equivalent means, and the uprights are stayed transversely by the parts D of the frame passing over the back of the horse and connected to said uprights at or near the upper ends, or by the cross-bar H; or any other approved arrangement of cross or transverse stays or braces may be employed. Said uprights may also be stayed forward and backward by braces G. I have in this example represented the uprights as constructed of two parts, rising up from the outside and inside of the wheels, and connected together at the top, which is well calculated to give strength and stability; but I do not limit myself to this arrangement, for a substantial construction may be made by means of an arch extending from the axles inside of the wheels over the back of the horse; and other arrangements may also be employed in connection with my said contrivance of the frame. The legs of the rider will go astride of the horse and rest on the frame each side or on foot-rests suitably attached thereto.

I am aware that a sulky has been made with the axle curved around the rear of the horse, back of the center of the wheels, but having the thills open at the breast.

I am also aware that the thills have been extended, wholly or in part, around the breast of the horse, and I do not claim such arrangement singly or except in connection with my improvements.

Having thus described my invention, what I claim, and desire to secure by Letters Patent, is—

The combination, with the wheels of a sulky located ahead of the position of the hind part of the horse and along his sides when harnessed thereto and arranged on short independent axles, of a frame going wholly around the horse, or around the breast and over the back, and a seat supported over the back of the horse by supports rising up from over the axles, substantially as described.

THOMAS W. MOORE.

Witnesses:
W. J. MORGAN,
S. H. MORGAN.